UNITED STATES PATENT OFFICE.

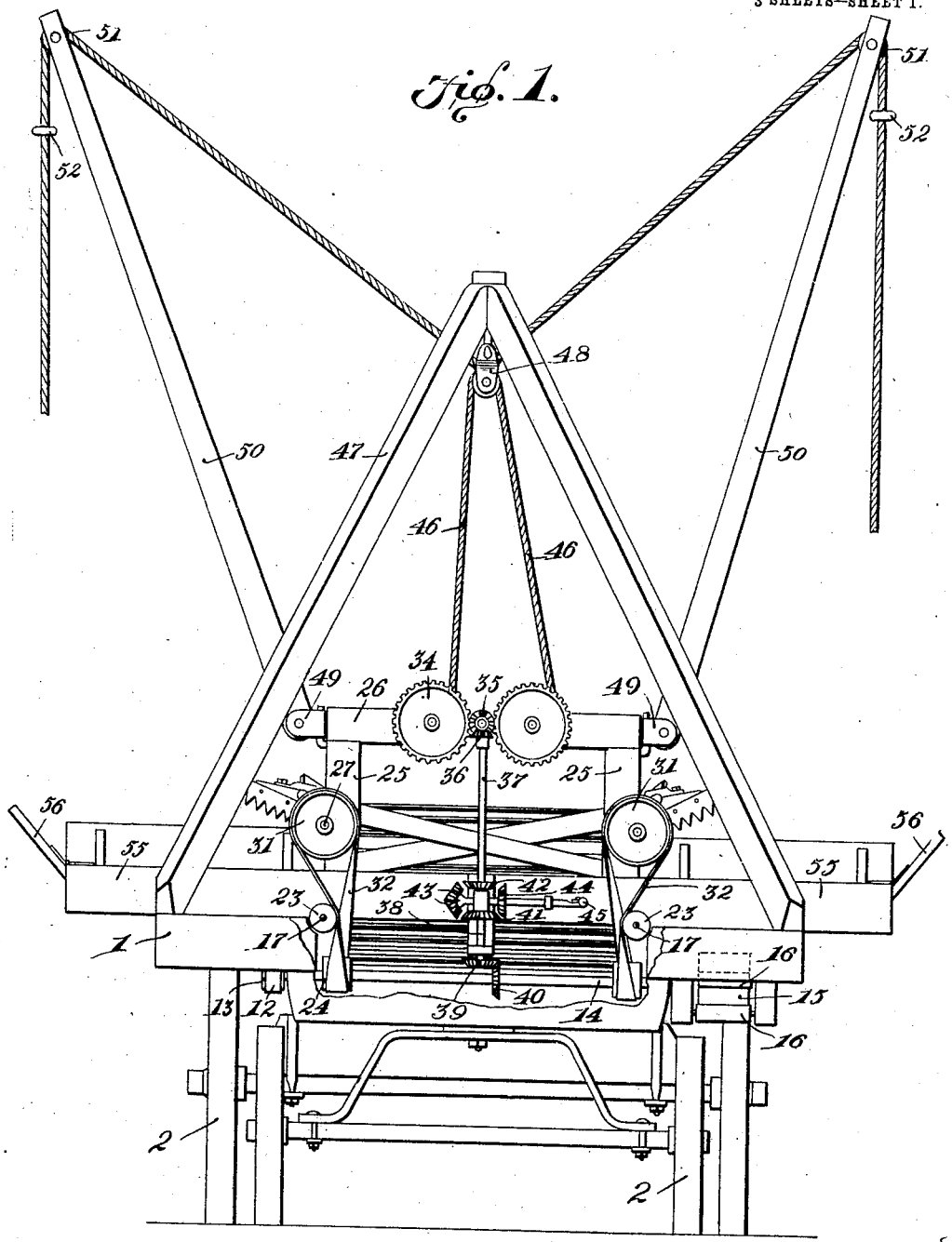

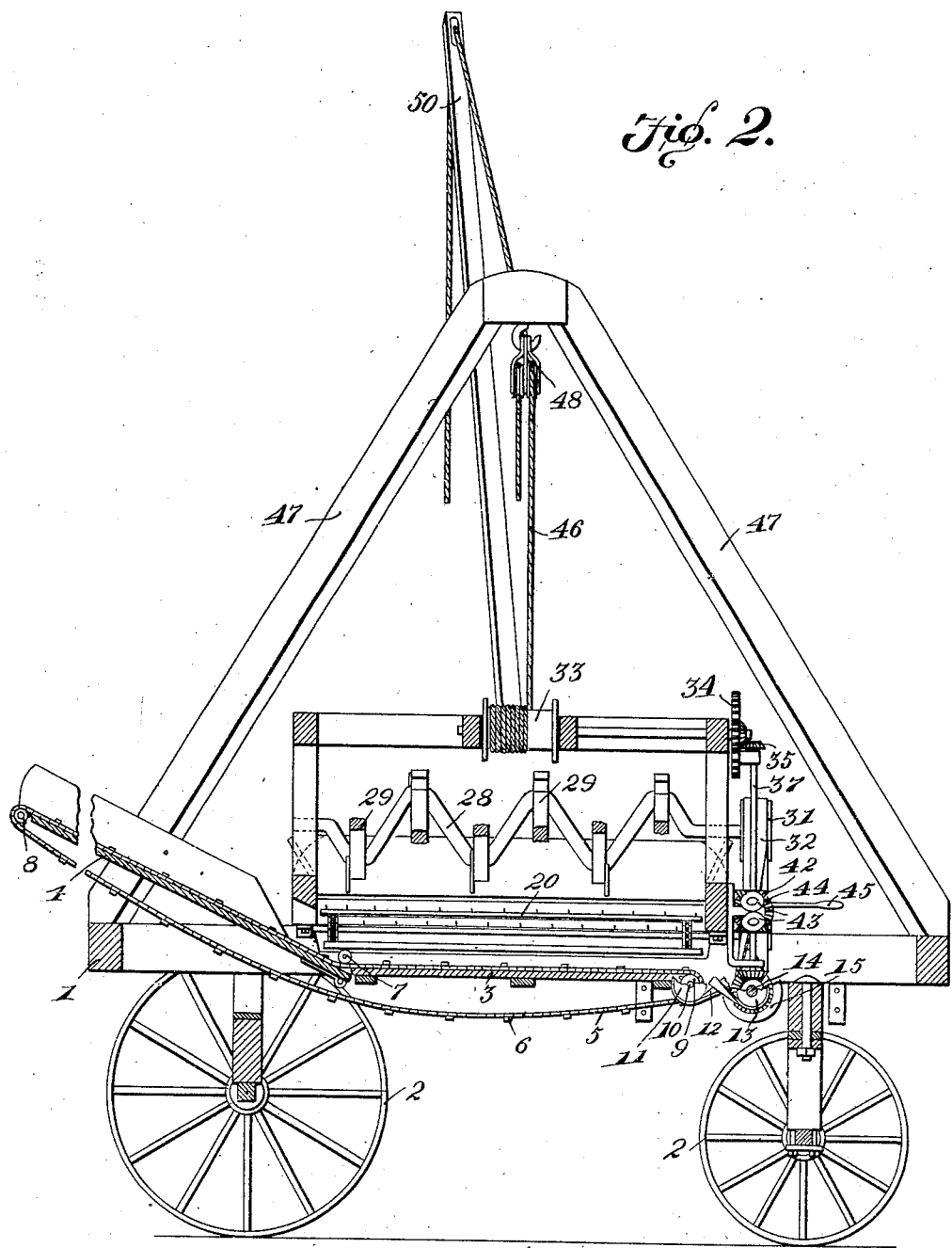

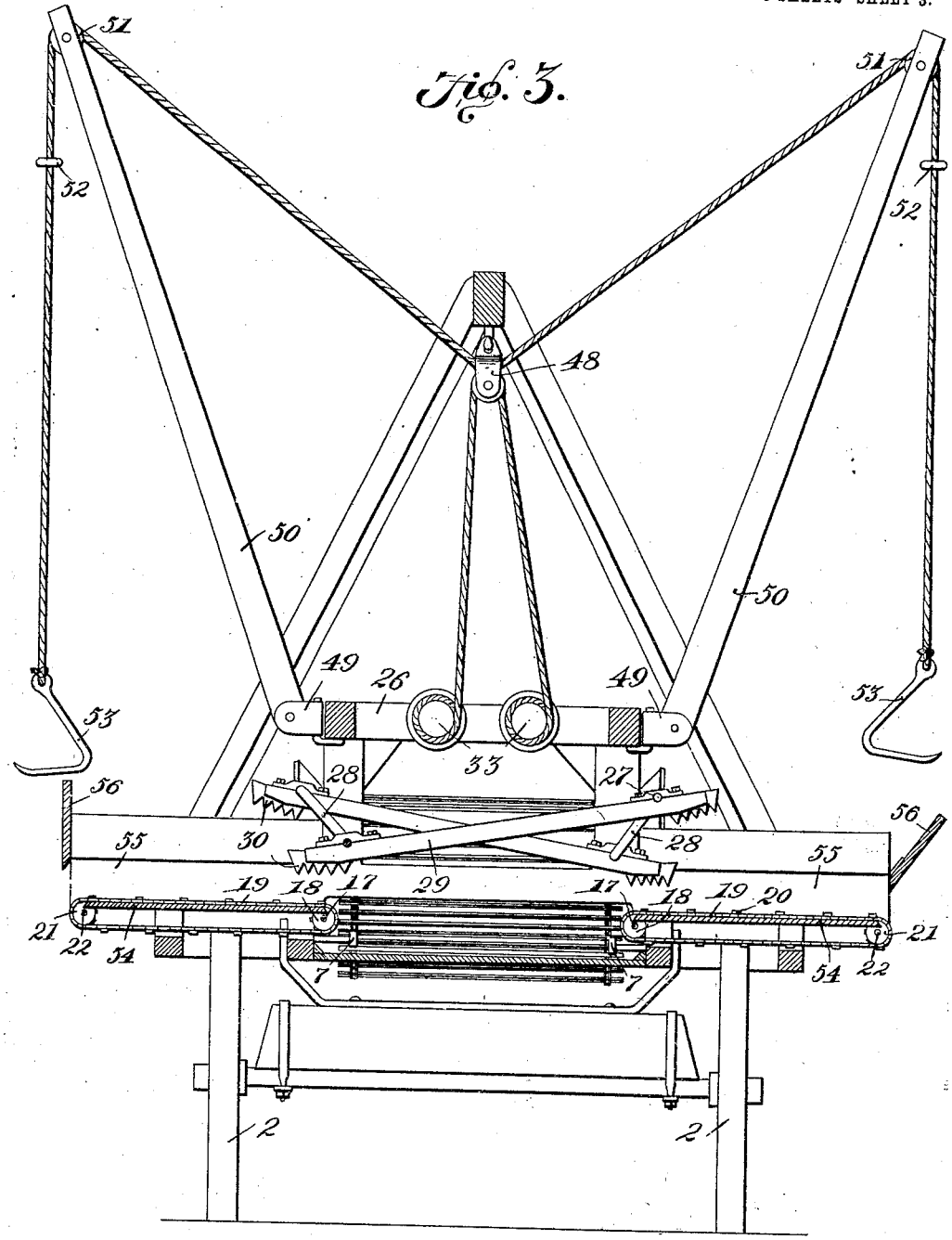

CHARLES D. MARKEY, OF ELLINWOOD, KANSAS.

FEEDER FOR THRESHING-MACHINES.

No. 839,865.  Specification of Letters Patent.  Patented Jan. 1, 1907.

Application filed April 28, 1906. Serial No. 314,268.

*To all whom it may concern:*

Be it known that I, CHARLES D. MARKEY, a citizen of the United States, residing at Ellinwood, in the county of Barton and State of Kansas, have invented a new and useful Feeder for Threshing-Machines, of which the following is a specification.

This invention relates to pitchers and feeders for threshing-machines; and its object is to provide a machine adapted to be connected to a threshing-machine and to convey grain from stacks or wagons at opposite sides of the machine and deposit it on carriers which in turn convey it to the threshing-machine.

The object of the invention is to provide simple mechanism for pitching and conveying the grain, the said mechanism being actuated by the power-belt used for driving the threshing-machine.

With the above and other objects in view the invention consists of a movable platform on which is mounted a longitudinally-extending endless carrier, a portion of which is adjustable to different elevations, so as to facilitate the discharge of material therefrom into a threshing-machine. Side carriers are mounted on the platform for conveying material to the longitudinal carrier, and disposed above all of these carriers is a series of rocking bars having fingers on them for gripping the material and drawing it onto the longitudinal carrier. Cranes are carried above the platform and are provided with hoisting mechanism, whereby material can be carried from stacks or wagons at the sides of the platform and discharged upon the side carriers.

The invention also consists of certain other novel features of construction and combinations of parts, which will be hereinafter more fully described, and pointed out in the claims.

In the accompanying drawings is shown the preferred form of the invention.

In said drawings, Figure 1 is a front elevation of the machine. Fig. 2 is a longitudinal section therethrough, and Fig. 3 is a central transverse section.

Referring to the figures by characters of reference, 1 is a frame constituting the top of the machine, said frame being preferably rectangular in form and supported in any desired manner by wheels 2. A platform 3 is disposed longitudinally of the frame adjacent its center and a platform-section 4 is pivoted adjacent one end of the platform 3 and constitutes an extension thereof. This section 4 may be of any desired length, and mounted upon it and the platform 3 is an endless carrier consisting of chains 5, connected by slats 6. Suitable means, as rollers 7, are located above the adjoining edges of the section 4 and platform 3 for the purpose of holding the carrier flat upon the upper surfaces of the two platform-sections. The chains 5 extend around sprockets 8, located at the outer end of the section 4, and also around sprockets 9, which are secured to a shaft 10, adjacent the front end of the platform 3. A pulley 11 is mounted on the shaft and is driven by a belt 12, mounted on a drive-pulley 13. This pulley is secured to the power-shaft 14, arranged adjacent the front end of frame 1 and provided with a large pulley 15, adapted to be driven by the belt (not shown) extending from the engine which is usually employed for operating a threshing-machine. Guide-rollers 16 are disposed adjacent the pulley 15 for the purpose of holding the drive-belts in proper position thereon.

Journaled upon the frame 1, adjacent the sides of the longitudinal carrier, are shafts 17, each having a pair of sprockets 18, which engage endless chains 19, connected by slats 20, and constituting laterally-extending endless carriers. The outer portions of these carriers are supported by sprockets 21 on shafts 22, journaled upon the machine in any preferred manner. Each shaft 17 has a pulley 23 at its forward end, and arranged below each of these pulleys and upon the shaft 14 is a pulley 24.

Standards 25 extend upward from the frame 1 and support a supplemental or top frame 26. Journaled in these standards 25 are shafts 27, each formed with a plurality of cranks 28, and the two shafts have the same number of cranks. The cranks of the shafts 27 support rocking bars 29, each bar being connected to a crank of each shaft and the cranks of said shafts being so disposed that when the two shafts rotate in one direction in unison a rocking as well as a reciprocating movement will be imparted to the bars alternately. Each bar has a series of fingers 30 hanging from its end, adapted to coöperate with the side carriers for pulling material toward the center of the machine and onto the longitudinal carrier. A pulley 31 is secured upon the front end of each shaft 27, and extending around each of these pulleys is a belt 32, which also extends around the pulley 24 thereunder and is twisted so as to bear upon the adjoining pulley 23. By arranging the belts and pulleys in the manner described power can be transmitted through the belts 32 from shafts 14 to the pulley 31, so as to cause said pulleys to rotate in the same direction and at the same speed and at the same time cause the pulleys 23 to rotate in the opposite directions at the same speed. The two side carriers will thus be operated so as to carry material toward the longitudinal carrier.

Windlasses 33 are rotatably mounted upon the top frame 26, and a gear 34 rotates with each of these windlasses, both gears being driven by an intermediate gear 35, which receives power from a gear 36 on a shaft 37. Another shaft 38 receives motion through gears 39 and 40 from shaft 14, and suitable mechanism is interposed between the shafts 37 and 38 for the purpose of regulating or reversing the transmission of power from shaft 38 to shaft 37. Any desired form of mechanism may be employed for this purpose; but in the drawings it has been shown as consisting of a gear 41, secured to shaft 38, and another gear 42, secured to shaft 37. A slide is interposed between the gears and carries at one end meshing gears 43, adapted to be slid into mesh with the gears 41 and 42, and another gear 44 is carried by the slide and is adapted to mesh with the opposite portions of the gears 41 and 42. This slide may be manipulated by means of a lever 45 so as to shift the gears 43 or the gears 44 into engagement with gears 41 and 42, or by partly moving the slide all of the gears can be held out of mesh with gears 41 and 42, so that motion will not be transmitted to the upper shaft 37.

Inclined beams 47 are fastened to the corners of the frame 1 and are secured together at their upper ends to form a substantially pyramidal frame. A pulley-block 48 is swiveled to and supported by the beams at their point of connection, and extending through this block in opposite directions are cables 46, which are secured to and adapted to be wound on the windlasses 33. A bracket 49 is mounted to swing on each side of the top of the frame 26, and pivoted within each of these brackets is a boom 50, carrying a pulley 51 at its upper end, over which one of the cables 46 extends. Each cable has a stop 52 for limiting its upward movement, and a fork 53 of any desired construction is connected to the end of each cable.

It is of course to be understood that a platform 54 extends under each side carrier for supporting the upper portion thereof, and the side boards 55 are arranged along the sides of each carrier to prevent displacement of material while being conveyed thereby. End boards 56 are hinged to the ends of the side board and are normally supported in inclined positions for directing material onto the carriers. These end boards, however, can be swung out of the way while the machine is passing near the stacks.

The machine herein described is adapted to be connected to the front end of a threshing-machine, and the power-belt of said threshing-machine is extended from the engine and under the platform 1, so as to contact with and rotate the drive-pulley 15. Shaft 14 will therefore be caused to rotate and will transmit motion from the belts 32 to the side conveyers and to the rocking bars 29, as hereinbefore described. Motion will also be transmitted by the belt 12 to the longitudinal carrier. Shaft 38 will be rotated by gears 40 and 39. Should a stack be located at each side of the device, motion can be transmitted to the shaft 37 by shifting the gears 43 and 44, so that said shaft will operate to unwind the cables 46 and lower the forks 53. The forks can be placed in engagement with the material of the stack, and the gears 43 and 44 can then be again shifted so that the forks 53 will be moved upward, carrying the material therewith until the stops 52 come into contact with the booms. Said booms will then be swung vertically by the continued rotation of the windlasses, and when the forks have reached a desired position above the side carriers the motion of the shaft 37 can be stopped and the material dumped onto the carrier. These carriers convey the material toward the longitudinal carriers, and the fingers 30 on the bars 29 will engage the material and pull it onto the longitudinal carrier. Said carrier will then conduct the material to the threshing-machine. By means of this device bundles of grain can be quickly fed to a threshing-machine from a plurality of stacks. It is to be understood that any desired forms of forks 53 may be employed and that any preferred mechanism other than that shown may be provided for properly actuating the windlasses at desired intervals.

The preferred form of the invention has been set forth in the foregoing description; but I do not limit myself thereto, as I am aware that certain modifications may be made therein without departing from the spirit or sacrificing the advantages thereof, and I therefore reserve the right to make such changes as fairly fall within the scope of the invention.

What is claimed is—

1. In a feeding device for threshing-machines the combination with a portable frame having longitudinal and side carriers; of rocking and reciprocating bars supported above the carriers, means for actuating the bars for shifting material from the side carriers to the longitudinal carriers, and hoisting mechanism at the sides of the frame for conveying material to and depositing it upon the side carriers.

2. A feed attachment for threshing-machines comprising a portable frame, longitudinal and side carriers mounted thereon, reciprocating rocking bars for directing material from the side carriers to the longitudinal carriers, a drive-shaft, means for transmitting continuous motion therefrom to the bars and carriers, hoisting mechanism extending above and beyond the sides of the frame, and means operated by the drive-shaft for raising or lowering the hoisting mechanism during the actuation of the carriers and bars.

3. A feed attachment for threshing-machines comprising a portable frame, a longitudinal endless carrier mounted thereon, laterally-extending endless carriers adjacent to the longitudinal carrier, crank-shafts extending transversely o. the lateral carriers, toothed bars carried by the cranks and adapted to be reciprocated and rocked thereby, said bars extending transversely of the longitudinal carrier and above the lateral carriers, a drive-shaft, means for transmitting rotary motion from said shaft direct to each crank-shaft, oppositely-disposed hoisting mechanism, and means for transmitting rotary motion from the drive-shaft independently of the movement of the crank-shafts for actuating said mechanism to raise or lower material.

In testimony that I claim the foregoing as my own I have hereto affixed my signature in the presence of two witnesses.

CHARLES D. MARKEY.

Witnesses:
   P. B. KRINGLER,
   H. G. HOFMANN.